(12) United States Patent
Huang

(10) Patent No.: US 12,450,882 B2
(45) Date of Patent: Oct. 21, 2025

(54) TRAINING SYSTEM AND METHOD

(71) Applicant: Deka Products Limited Partnership, Manchester, NH (US)

(72) Inventor: Kavya Huang, Manchester, NH (US)

(73) Assignee: DEKA Product Limited Partnership, Manchester, NH (US)

( * ) Notice: Subject to any disclaimer, the term of this patent is extended or adjusted under 35 U.S.C. 154(b) by 384 days.

(21) Appl. No.: 18/057,887

(22) Filed: Nov. 22, 2022

(65) Prior Publication Data
US 2023/0162486 A1 May 25, 2023

Related U.S. Application Data (60) Provisional application No. 63/264,409, filed on Nov. 22, 2021.

(51) Int. Cl.
*G06V 10/00* (2022.01)
*G06V 10/774* (2022.01)
(Continued)

(52) U.S. Cl.
CPC .......... *G06V 10/774* (2022.01); *G06V 10/776* (2022.01); *G06V 20/588* (2022.01); *B60W 60/00* (2020.02); *B60W 2420/403* (2013.01)

(58) Field of Classification Search
CPC .. G06V 10/774; G06V 10/776; G06V 20/588; G06V 10/778; G06V 20/58; B60W 60/00; B60W 2420/403; G06F 18/217
See application file for complete search history.

(56) References Cited

U.S. PATENT DOCUMENTS 11,080,562 B1 * 8/2021 Saxena ................ G06V 10/451
11,657,531 B1 * 5/2023 Ebrahimi Afrouzi .. G06V 10/44
382/284

(Continued)

FOREIGN PATENT DOCUMENTS

EP 3543906 A1 9/2019
EP 3 543 906 B1 11/2023

OTHER PUBLICATIONS

Di Feng et al: "A Review and Comparative Study on Probabilistic Object Detection in Autonomous Driving", arxiv.org, Cornell University Library, 201 Olin Library Cornell University Ithaca, NY 14853, Nov. 20, 2020 (Nov. 20, 2020), XP081819986, the whole document.

(Continued)

*Primary Examiner* — Md K Talukder
(74) *Attorney, Agent, or Firm* — William A. Bonk, III (57) ABSTRACT

A training system and method identifies pixels in an image that fall within a desired range of uncertainty and uses them to train a machine learning model. Predicted pixel classification probability values may be normalized. A count of normalized predicted pixel classification probability values that fall within the range of uncertainty may be obtained for each classification label. For each classification label, the count may be divided by the total number of normalized predicted pixel classification probability values to generate an associated uncertainty ratio. Pixels of an under-represented classification label that has an uncertainty ratio in the desired range of uncertainty may be used to train the machine learning model.

3 Claims, 6 Drawing Sheets

(51) Int. Cl.
  *G06V 10/776* (2022.01)
  *G06V 20/56* (2022.01)
  *B60W 60/00* (2020.01)

(56) References Cited

U.S. PATENT DOCUMENTS

| | | |
|---|---|---|
| 2018/0349785 A1 | 12/2018 | Zheng et al. |
| 2021/0117760 A1 | 4/2021 | Krishnan et al. |
| 2021/0139023 A1* | 5/2021 | Crego .................. G06V 20/584 |
| 2023/0162486 A1* | 5/2023 | Huang .................. G06F 18/217 |
| | | 382/159 |

OTHER PUBLICATIONS

U.S. Appl. No. 18/057,887, filed Nov. 22, 2022, Inventor: Kavya Huang, Confirmation No. 4509.

Notification of Transmittal of the International Search Report and the Written Opinion of the International Searching Authority mailed Apr. 3, 2023 for PCT/US2020/080308 filed Nov. 22, 2022. 13 pages.

Notification Concerning Transmittal of International Preliminary Report on Patentability mailed Jun. 6, 2024 for PCT/US2020/080308 filed Nov. 22, 2022. 9 pages.

* cited by examiner

TRAINING SYSTEM AND METHOD

CROSS-REFERENCE TO RELATED APPLICATIONS

This application claims the benefit of U.S. Provisional Patent Application Ser. No. 63/264,409 filed Nov. 22, 2021, entitled TRAINING SYSTEM AND METHOD, which is incorporated herein by reference in its entirety.

BACKGROUND

This disclosure relates generally to computer vision. More specifically, this disclosure pertains to techniques for training machine learning engines resident on autonomous vehicles.

Machine learning engines generally require training in order to improve their classification capabilities. Training typically involves running large datasets through a machine learning engine, thereby enabling the machine learning engine to learn. For example, by passing a sufficiently large number of images of cats through a machine learning engine, the machine learning engine can be trained to recognize an image of a cat among other images. The number of images of cats must be of substantial size. For this reason as well as others, it is desirable to improve the efficiency of training models for machine learning engines.

The above-described background is merely intended to provide a contextual overview of some current issues, and is not intended to be exhaustive.

BRIEF DESCRIPTION OF THE DRAWINGS

Non-limiting and non-exhaustive aspects of the subject disclosure are described with reference to the following figures, wherein like reference numerals refer to like parts throughout the various views unless otherwise specified.

DETAILED DESCRIPTION

In the following description, numerous specific details are set forth to provide a thorough understanding of various aspects and arrangements. One skilled in the relevant art will recognize, however, that the techniques described herein can be practiced without one or more of the specific details, or with other methods, components, materials, etc. In other instances, well known structures, materials, or operations may not be shown or described in detail to avoid obscuring certain aspects.

Reference throughout this specification to "an aspect," "an arrangement," or "a configuration" indicates that a particular feature, structure, or characteristic is described. Thus, appearances of phrases such as "in one aspect," "in one arrangement," "in a configuration," or the like in various places throughout this specification do not necessarily each refer to the same aspect, feature, configuration, or arrangement. Furthermore, the particular features, structures, and/or characteristics described may be combined in any suitable manner.

To the extent used in the present disclosure and claims, the terms "component," "system," "platform," "layer," "selector," "interface," and the like are intended to refer to a computer-related entity or an entity related to an operational apparatus with one or more specific functionalities, wherein the entity may be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server itself can be a component. One or more components may reside within a process and/or thread of execution and a component may be localized on one computer and/or distributed between two or more computers. In addition, components may execute from various computer-readable media, device-readable storage devices, or machine-readable media having various data structures stored thereon. The components may communicate via local and/or remote processes such as in accordance with a signal having one or more data packets (e.g., data from one component interacting with another component in a local system, a distributed system, and/or across a network such as the Internet with other systems via the signal). As another example, a component can be an apparatus with specific functionality provided by mechanical parts operated by electric or electronic circuitry, which may be operated by a software or firmware application executed by a processor, wherein the processor can be internal or external to the apparatus and executes at least a part of the software or firmware application. As yet another example, a component can be an apparatus that provides specific functionality through electronic components without mechanical parts; the electronic components can include a processor therein to execute software or firmware that confers at least in part the functionality of the electronic components.

To the extent used in the subject specification, terms such as "store," "storage," "data store," data storage," "database," and the like refer to memory components, entities embodied in a memory, or components comprising a memory. It will be appreciated that the memory components described herein can be either volatile memory or nonvolatile memory, or can include both volatile and nonvolatile memory.

In addition, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject disclosure and claims should generally be construed to mean "one or more" unless specified otherwise or clear from context to be directed to a singular form.

The words "exemplary" and/or "demonstrative," to the extent used herein, mean serving as an example, instance, or illustration. For the avoidance of doubt, the subject matter disclosed herein is not limited by disclosed examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, application data, implicit data, explicit data, etc. Inference can be employed to identify a specific context or action or can generate a probability distribution over states of interest based on a consideration of data and events, for example.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture," to the extent used herein, is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), digital video disc (DVD), Blu-ray Disc™ (BD)); a smart card; a flash memory device (e.g., card, stick, key drive); a virtual device that emulates a storage device; and/or any combination of the above computer-readable media.

Generally, program modules include routines, programs, components, data structures, etc., that perform particular tasks or implement particular abstract data types. The illustrated embodiments of the subject disclosure may be practiced in distributed computing environments where certain tasks are performed by remote processing devices that are linked through a communications network. In a distributed computing environment, program modules can be located in both local and remote memory storage devices.

Computing devices can include at least computer-readable storage media, machine-readable storage media, and/or communications media. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media that can be used to store desired information. In this regard, the terms "tangible" or "non-transitory" herein as applied to storage, memory, or computer-readable media, are to be understood to exclude only propagating transitory signals per se as modifiers, and do not exclude any standard storage, memory or computer-readable media that are more than only propagating transitory signals per se.

Computer-readable storage media can be accessed by one or more local or remote computing devices, e.g., via access requests, queries, or other data retrieval protocols, for a variety of operations with respect to the information stored by the medium.

A system bus, as may be used herein, can be any of several types of bus structure that can further interconnect to a memory bus (with or without a memory controller), a peripheral bus, and a local bus using any of a variety of commercially available bus architectures. A database, as may be used herein, can include basic input/output system (BIOS) that can be stored in a non-volatile memory such as ROM, EPROM, or EEPROM, with BIOS containing the basic routines that help to transfer information between elements within a computer, such as during startup. RAM can also include a high-speed RAM such as static RAM for caching data.

As used herein, a computer can operate in a networked environment using logical connections via wired and/or wireless communications to one or more remote computers. The remote computer(s) can be a workstation, server, router, personal computer, portable computer, microprocessor-based entertainment appliance, peer device, or other common network node. Logical connections depicted herein may include wired/wireless connectivity to a local area network (LAN) and/or larger networks, e.g., a wide area network (WAN). Such LAN and WAN networking environments are commonplace in offices and companies, and facilitate enterprise-wide computer networks, such as intranets, any of which can connect to a global communications network, e.g., the Internet.

When used in a LAN networking environment, a computer can be connected to the LAN through a wired and/or wireless communication network interface or adapter. The adapter can facilitate wired or wireless communication to the LAN, which can also include a wireless access point (AP) disposed thereon for communicating with the adapter in a wireless mode.

When used in a WAN networking environment, a computer can include a modem or can be connected to a communications server on the WAN via other means for establishing communications over the WAN, such as by way of the Internet. The modem, which can be internal or external, and a wired or wireless device, can be connected to a system bus via an input device interface. In a networked environment, program modules depicted herein relative to a computer or portions thereof can be stored in a remote memory/storage device.

When used in either a LAN or WAN networking environment, a computer can access cloud storage systems or other network-based storage systems in addition to, or in place of, external storage devices. Generally, a connection between a computer and a cloud storage system can be established over a LAN or a WAN, e.g., via an adapter or a modem, respectively. Upon connecting a computer to an associated cloud storage system, an external storage interface can, with the aid of the adapter and/or modem, manage storage provided by the cloud storage system as it would other types of external storage. For instance, the external storage interface can be configured to provide access to cloud storage sources as if those sources were physically connected to the computer.

As employed in the subject specification, the term "processor" can refer to substantially any computing processing unit or device comprising, but not limited to comprising, single-core processors; single-core processors with software multithread execution capability; multi-core processors; multi-core processors with software multithread execution capability; multi-core processors with hardware multithread technology; vector processors; pipeline processors; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a state machine, discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. For example, a processor may be implemented as one or more processors together, tightly coupled, loosely coupled, or remotely located from each other. Multiple processing chips or multiple devices may share the performance of one or more functions described herein, and similarly, storage may be effected across a plurality of devices.

As an overview, various arrangements are described herein. For simplicity of explanation, the methods are depicted and described as a series of steps or actions. It is to be understood and appreciated that the various arrangements are not limited by the actions illustrated and/or by the order of actions. For example, actions can occur in various orders and/or concurrently, and with other actions not presented or described herein. Furthermore, not all illustrated actions may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers.

Figure 1:
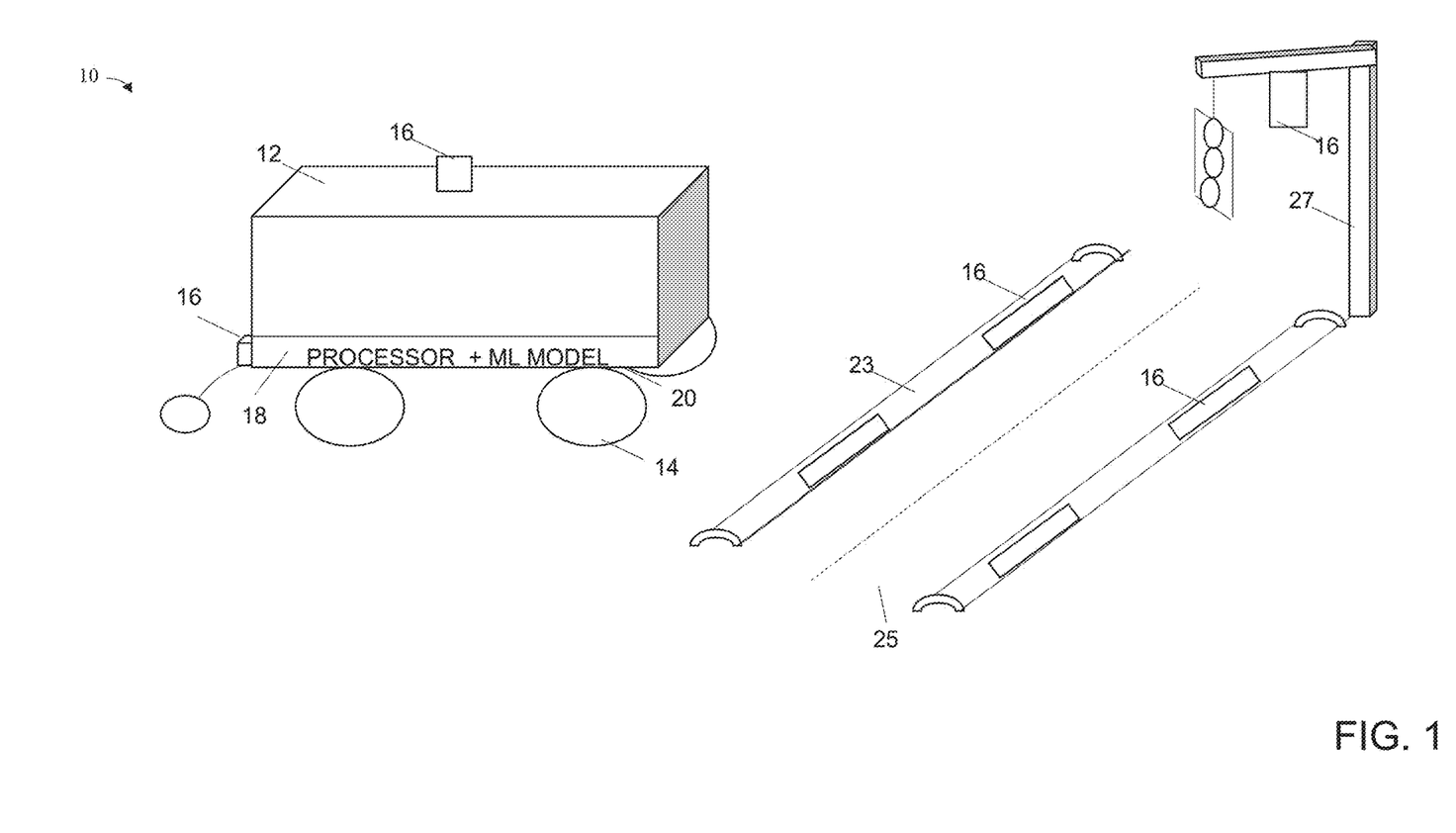
FIG. 1 is a high level block diagram of an autonomous vehicle in accordance with various aspects of the subject disclosure.

With reference to FIG. 1, the system and method of the present teachings rely on incoming data to improve model predictions for relatively rare features. The system and method of the present teachings can apply to any dataset, whether it be collected and stored, generated artificially, or collected and assessed in real time. For example, data can be collected by a moving vehicle, a sensor mounted on a traffic light, sensors embedded in road features, or sensors mounted on drones, among other collection means. The moving vehicle can be manually operated or autonomous, or a combination of the two. In an aspect, the data that is collected in real time can be used to navigate the vehicle while it is being used to improve model predictions. The sensors can include cameras producing image data, short- or long-range. Data from other sensors such as, for example, but not limited to, LIDAR, radar, and ultrasonic sensors, when converted to image data, can be used to generate data suitable for examination by the system of the present teachings. In at least one arrangement, an autonomous vehicle 10, or bot 10, may include a body 12 supported and movable by a plurality of wheels 14. At least one of the plurality of wheels 14 may be a caster wheel, as would be readily appreciated by one skilled in the art, to enable the bot 10 to more effectively traverse various terrains. The body 12 may include at least one sensor 16 that may receive data about the environment proximate to the bot 10. The at least one sensor 16 may be configured to receive any of at least optical, infrared, LIDAR, radar, ultrasonic, or other relevant forms of data about the environment around the bot 10. The body 12 may include at least one processor 18 housed therein and coupled to the at least one sensor 16 so as to receive and process data from the at least one sensor 16, and to use the processed data to direct the bot 10 to navigate in accordance with the environment around the bot 10. The at least one processor 18 may include, and/or may execute, a machine learning engine 20 to assist in recognizing and classifying or categorizing received image data about the environment around the bot 10. Sensors 16 can be positioned to provide all sorts of data that could be of use in traffic management. Those data could also be accessed to improve a machine learning model's prediction capability. For example, sensors 16 can be positioned on traffic pole 27, or embedded in features 23 of roadway 25.

Figure 2:
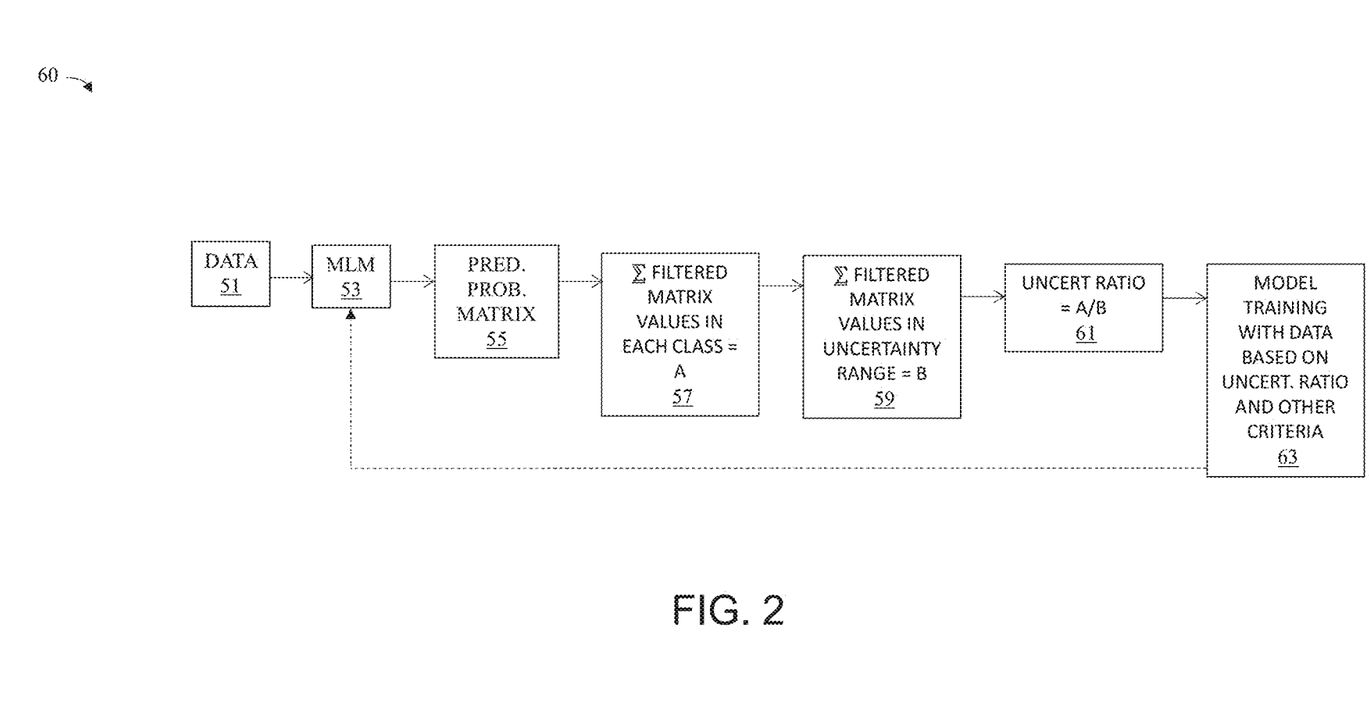
FIG. 2 is a schematic block diagram of the components of an implementation of the system of the present teachings.

Referring now to FIG. 2, system 60 for improving the prediction capability of a machine learning model for relatively rare features can include one or more processors that can execute instructions to implement the data processing necessary to create data that can be used to train the machine learning model. System 60 of the present teachings includes at least one processor executing instructions to receive data, predict the probabilities of classifications of the data, assess the total number of predictions in each classification, filter the predictions and assess the number of predictions in each classification in the filtered predictions, and use the comparisons of the assessments to select data to train a machine learning model. System 60 can include, but is not limited to including, machine learning model 53 receiving data 51 and generating prediction probability matrix 55. As described herein, data 51 can include many forms of sensor data gathered in any of several ways by any of several sensor types. Machine learning model 53 can include models that are known to those of skill and may include, as non-limiting and non-exhaustive examples, clustering, dimensionality reduction, ensemble methods, neural nets (e.g., convolutional neural network models) and deep learning, transfer learning, reinforcement learning, natural language processing, and word embeddings. Many suitable techniques for object detection and recognition would be readily appreciated by one of skill in the art, including, by way of non-limiting example, Region-based Convolutional Neural Network (R-CNN), Fast R-CNN, Faster R-CNN, Region-based Fully Convolutional Network (R-FCN), Histogram of Oriented Gradients (HOG), Single Shot Detector (SSD), Spatial Pyramid Pooling (SPP-net), and You Only Look Once (YOLO).

Continuing to refer to FIG. 2, machine learning model 53 can include instructions to create prediction probability matrix 55. Machine learning model 53 can include a machine learning pipeline that may generally include at least two operations performed in sequence, the first operation being feature extraction from data 51 and the second operation being classification. Feature extraction may involve some number of convolution, activation, and pooling functions for each layer of an artificial neural network. A convolution function may use information from adjacent pixels to down-sample the image into features. Prediction layers may then be used to predict target values. Convolution generally involves sliding a kernel matrix across image data, one or more pixel(s) at a time, and generating dot products in each cell of a feature matrix to define an extracted feature. Those of skill would understand that suitable techniques other than convolution may be used for feature extraction. Activation may be used to introduce non-linearity into machine learning model 53. Activation may be performed after one or more of the convolution stages. Activation may be performed prior to pooling or subsequent to pooling. Activation may be performed using any of various known functions such as, by way of non-limiting examples, Rectified Linear Unit (ReLU), Sigmoid, or Tan h. ReLU is a piecewise linear function that outputs values that are positive and otherwise outputs zero. Pooling may be used to reduce spatial size of convolved feature matrices. Pooling may include, as examples, max pooling or average pooling. Max pooling reduces the size of an image by down sampling. For example, in a typical convolutional network, the height and width of an image gradually reduces (down sampling, because of pooling), which helps the filters in deeper layers to focus on a larger receptive field (context). However the number of channels/depth (number of filters used) gradually increases, which helps to extract more complex features from the image. With down sampling, a model (e.g., the U-Net algorithm) may better understand what is present in an image, but may lose the information of where it is present (hence the need, also, for up-sampling). Pooling functions may operate similarly to convolution, but a maximum value of the image region overlapped by the kernel (or an average value of the image region overlapped by the kernel) is taken, rather than a dot product. One skilled in the art would appreciate that suitable architectures other than sliding window convolutional networks may be used including, for example, but not limited to, the publicly available U-Net deep learning architecture for semantic segmentation. The U-Net algorithm is a convolutional network architecture for fast and precise segmentation of images, which has outperformed methods such as sliding-window convolutional networks. In some arrangements a U-Net neural network architecture may be used in which a contracting path deploying multiple convolution, ReLU activation, and max pooling actions may be used to reduce spatial information while feature information is generated, and an expanding path may be used to up-sample the spatial information and the feature information, ultimately generating output predictions.

Continuing to refer to FIG. 2, as those of skill in the art would understand, a static machine learning pipeline generally operates on a large dataset. The large dataset may be subsampled and annotated, and then used to train the machine learning model. In at least some arrangements, data may be collected from a route taken, or to be taken, by an autonomous vehicle or a bot. The collected data may then be labeled and used to train a machine learning module for execution by a processor housed in the bot. In contrast, a dynamic machine learning pipeline may require less supervision to train. Rather than using a random subset of collected data, or collecting random data, an algorithmic component may be appended in the training pipeline to help a human operator, or a machine, to judiciously select specific examples, and thereby reduce effort. As the machine learning engine begins to build up a model of how to predict, the machine learning engine may engage in uncertainty estimation by, e.g., flagging certain cases about which it is uncertain. In some arrangements, for example, for surface detection a softmax mean may be calculated for each image, or additionally or in the alternative for each class of image having a threshold degree of significance or importance to the bot (e.g., a curb), and if the score for any image falls into a range of interest, the range of interest covering cases in which the model becomes unsure of its prediction, that image may be provided to an annotation entity for annotating. Those of skill would appreciate that there are companies that provide such data annotation services. The annotated data may then be used to train the machine learning engine. As the "annotate and train" cycle is iterated, error rate for predictions may begin to decrease. Training with examples about which the machine learning engine is unsure, rather than using examples that the machine learning engine understands, may decrease the prediction error rate exponentially, enabling optimized (as may be defined by a threshold) classification at reduced cost (i.e., using significantly less human or machine supervision).

Continuing to refer to FIG. 2, in some arrangements, for example in situations in which multiple redundant sources of data are available (such as, e.g., when multiple classification models are used, for example a neural network based classification model and a deterministic classification model), a disagreement-based active learning approach may be deployed. For example, image data from each source for which there are disagreements in classifications of certain images in the data may be retained. Images for which there is repeated disagreement may be annotated and then the machine learning engine may be retrained using the annotated data.

Figure 3:
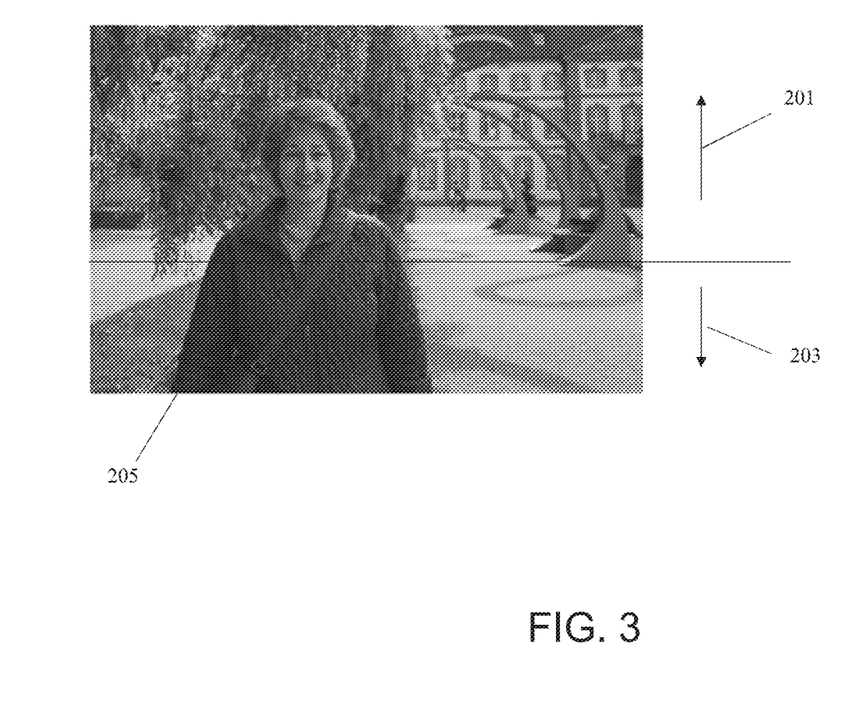
FIG. 3 is a pictorial representation of exemplary image cropping of the present teachings.

Continuing to refer to FIG. 2, in at least one arrangement, efficiency of training for a deep learning model that helps navigate an autonomous vehicle or a bot may be improved. Training data helps the deep learning model correctly interpret and classify each image it receives. Each image includes pixel data. In some arrangements, classification may be done at a pixel level rather than at an image level. As an example, for a route taken or to be taken by a bot, pixels may be classified as Background, Drivable, Enhanced Drivable (e.g., grass), Undrivable (e.g., posts, people), and Discontinuous Surface Feature (DSF) (e.g., curbs). DSF pixels may comprise approximately 2% of any set of data images. In some arrangements an active learning approach to training may be deployed wherein the deep learning model is trained only with data that is uncertain to some predefined uncertainty threshold or within some predefined range of uncertainty. Images including sufficiently uncertain pixel data may be sent to an annotation entity for annotation. Additionally or in the alternative, annotation may occur in real time as sufficiently uncertain pixels are encountered. In some arrangements classifications may be captured for only a part of an image, for example, the part of the image closest to the bot, as illustrated in FIG. 3. As those of skill would appreciate, part 203 (FIG. 3) of image 205 (FIG. 3) includes a depiction of the space that is relatively closest to a vertical standing bot. In an arrangement, classifications may be captured for only the closest two-fifths of each image, for example. It would be understood by those of skill that the fraction of an image for which data are captured may vary based at least on the height of the bot, and possibly other factors, and may be a tunable parameter, or hyperparameter.

Continuing to refer to FIG. 2, various criteria can be used to filter the values of prediction probability matrix 55. For example, matrix elements 55 can include values that are functions of the probabilities of classification of the data. Matrix elements 55 can be subjected to filtering such as eliminating negative values, normalizing the values, and cropping the data. Activation functions as discussed herein can be used for eliminating negative values and normalizing the dataset. Data can be cropped according to desired criteria. For example, the range, accuracy, and field of view of the sensors can be used to crop the data to achieve gathering the most appropriate data for the desired outcome.

In one example, the relatively rare features can include discontinuous surface features. In this case, sensors from which to gather data can be limited to those that gather surface data, and the data can be cropped to eliminate data that don't feature the surface, or that are farther than a pre-selected distance from the sensor. For example, FIG. 3 illustrates data cropping in which cropped percentage 201 (FIG. 3) of sensor data 205 (FIG. 3) (an image from a camera, for example) are cropped out because the sensor is closer to uncropped percentage 203 (FIG. 3), and therefore likely to be more reliable than cropped percentage 201 (FIG. 3). The filtered data can be subjected to evaluation. For example, a first parameter, A, can be computed by summing 57 filtered matrix values for each classification. Likewise, a second parameter, B, can be computed by summing 59 filtered matrix values within a pre-selected value range, for each classification. Other functions can be applied to filtered matrix values, depending upon the desired outcome. Parameters A and B can be used to filter data 51 to provide to a machine learning model a set of relatively rare data for training 63. For example, the ratio 61 of A to B can be used, along with other criteria, to decide which data are to be provided to train the model on relatively rare features. In some configurations, those data can be provided to machine learning model 53, so that machine learning model 53 can quickly improve. In some configurations, the improved model can be used for navigation as it improves.

Figure 4A:
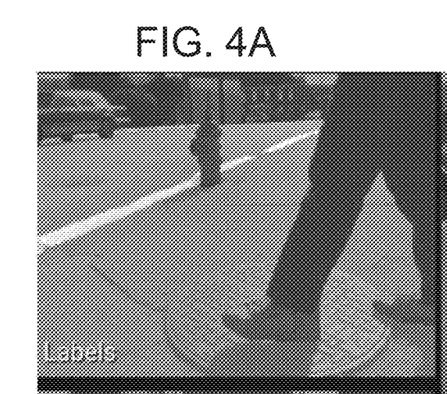
FIGS. 4A-4C is a pictorial representation of an example of a ground truth image.
Figure 4B:
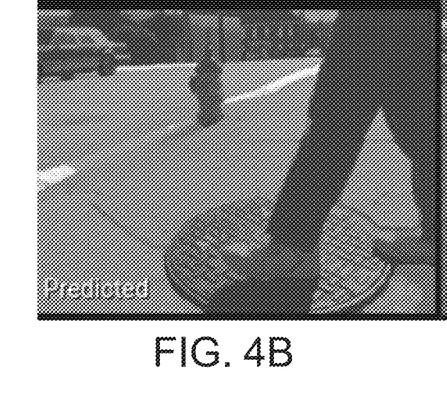
Figure 4C:
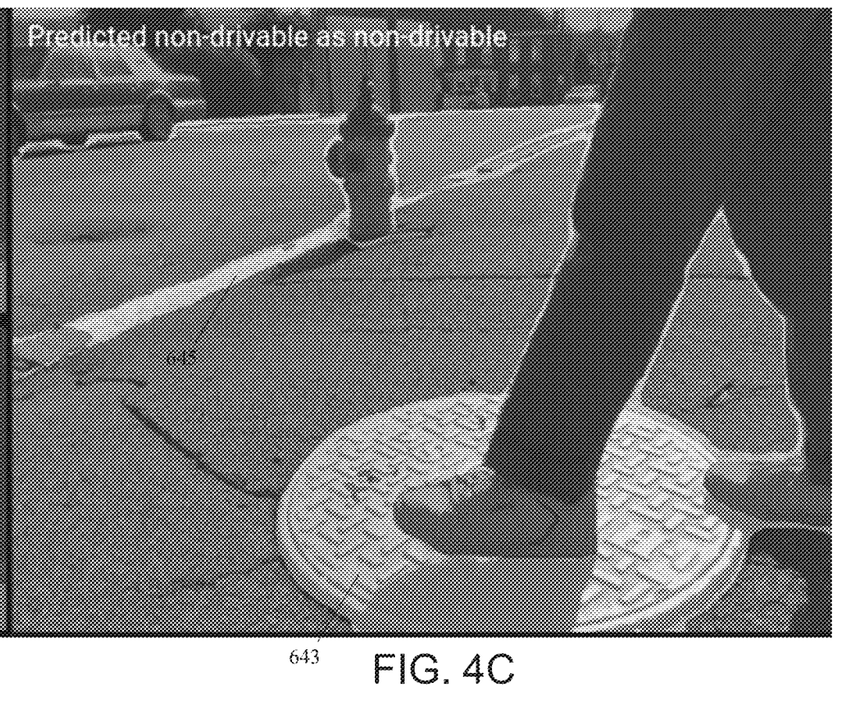

Referring now to FIGS. 4A-4C, to illustrate the matrix values for exemplary classifications for a curb feature, depicted are examples of ground truth images, model predictions, and their comparison. FIG. 4A is the actual ground truth classification provided by an annotation vendor for training a machine learning model on semantic segmentation tasks for road surfaces. In the example, the red part of the image depicts non-drivable surfaces, the green part of the image depicts a standard drivable surface, and the grey part of the image depicts a discontinuous surface feature. FIG. 4B illustrates the machine learning model's prediction of the image of FIG. 4A. FIG. 4C illustrates the contention between the ground truth and the prediction labels. Blue parts of this image illustrate pixels that were correctly classified, while yellow parts illustrate pixels that were wrongly classified. The machine learning model needs to have more data on the relatively rare features in the image that are wrongly classified. The system of the present teachings can provide the relatively rare data to train the model.

Figure 5:
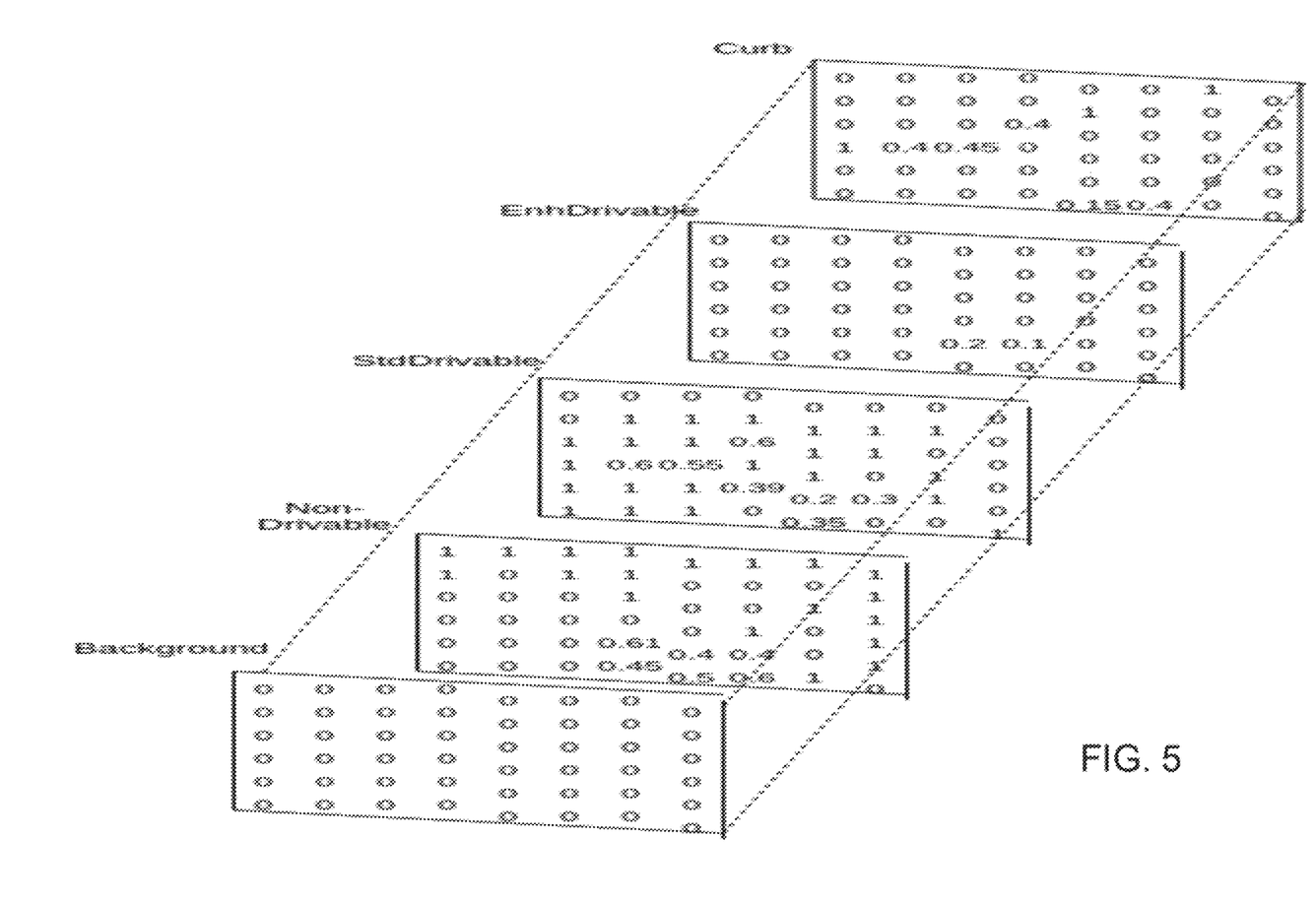
FIG. 5 is a depiction of layers of probabilities for various features of the representation of FIGS. 4A-4C.

FIG. 5 illustrates an example of what a filtered result for the image in FIGS. 4A-4C could look like. In the example, the class probability for each vector element is set to 1 where the model predicts the pixel classification with 100% certainty. Metal grate 643 (FIG. 4C) and discontinuous surface feature 645 (FIG. 4C), for example, non-drivable areas, are shown in the matrices of FIG. 5 as having <100% certainty of their classification. With respect to metal grate 643 (FIG. 4C), the system and machine learning model of the present teachings has decided that, with about a 50% average certainty, metal grate 643 (FIG. 4C) is a non-drivable surface, about a 30% average certainty that metal grate 643 (FIG. 4C) is a standard drivable surface, about a 15% average certainty that metal grate 643 (FIG. 4C) is an enhanced drivable surface, and about a 25% average certainty that metal grate 643 (FIG. 4C) is a curb. If the filtering includes selecting data with matrix values between 0.4 and 0.7, the non-drivable classification for metal grate 643 (FIG. 4C) include such data and would be selected to provide to the machine learning model. With respect to discontinuous surface feature (DSF) 645 (FIG. 4C), the system and machine learning model of the present teachings has decided that, with about a 57% average certainty, DSF 645 (FIG. 4C) is a standard drivable surface, and about a 43% average certainty that DSF 645 (FIG. 4C) is a curb. If the filtering includes selecting data with matrix values between 0.4 and 0.7, the standard drivable and the curb classifications for DSF 645 (FIG. 4C) include such data and would be selected to provide to the machine learning model.

Figure 6:
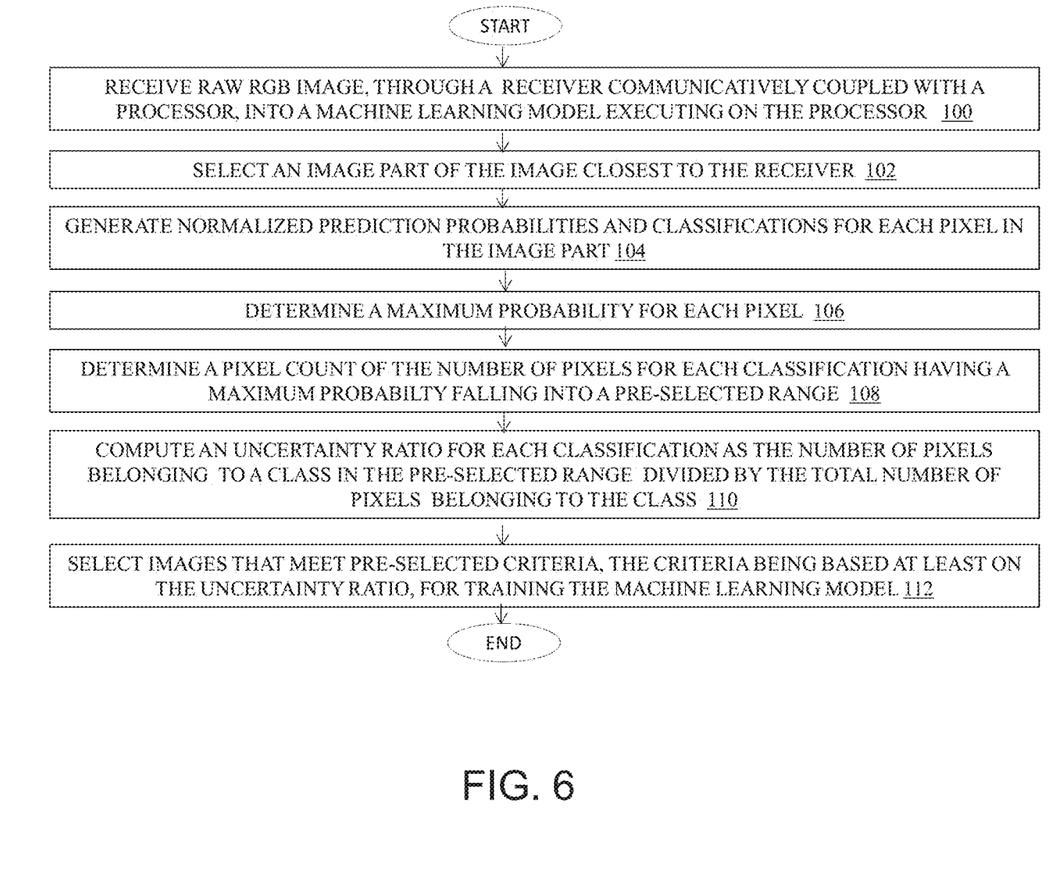
FIG. 6 is a flow chart depicting flow and actions in accordance with various aspects of the subject disclosure.

Referring now to FIG. 6, in at least one arrangement, a machine learning model for an autonomous vehicle or a bot may estimate uncertainty about the classification of images, and/or about the classification of at least one pixel within any such image, in image data about the environment proximate the bot. A surface detection model may be implemented with a semantic segmentation engine that may classify each pixel of a camera image into various classifications including, in one non-limiting example, the following classifications: Background, Bot Standard Drivable, Bot Enhanced Drivable, Bot Non Drivable, and DSF. In an arrangement the semantic segmentation model may be a U-Net model. The model may learn a reduced representation of an image via at least one down-sampling path through a neural network, while also preserving localized information about desired properties via at least one up-sampling path with skip connections through the neural network. An up-sampling path may be used to make a prediction of the image/pixel classification for unclassified images provided to the model.

Continuing to refer to FIG. 6, various performance measures for a segmentation engine may be used such as, by way of non-limiting example, Intersection over Union (IoU), or Jaccard Index. An IoU score may take into account false positives and/or false negatives for each classification, and thereby facilitate accurate reporting for imbalanced classes. Class imbalance occurs when the total number of images of one class of data is far less than the total number images of another class of data. While a limitation of the IoU metric is that accuracy of the classification boundaries is not reported, the IoU metric is nevertheless a commonly used performance measure.

Continuing to still further refer to FIG. 6, camera images, as a non-limiting example short-range camera images, may include road surfaces. A large batch of road image data may have resultant classifications such that drivable areas comprise close to 80% of the images and DSFs may constitute roughly 2% of the images, and thus there could be an inherent bias in the machine learning classifier, and bad classification of the minority class, i.e. the DSFs. In other words, because a machine learning model sees significantly more Drivable pixels than DSF pixels, the machine learning model is better able to recognize and accurately classify Drivable image data than it is DSF image data. Non-Drivable areas and Enhanced Drivable areas may each constitute on the order of 10% of the images. Performance of a machine learning model on less presented classes (for example DSFs), may be improved by focusing data collection on obtaining more samples of the under-represented class and fine-tuning training of the model on this data. Under-represented features such as, e.g., DSFs (e.g., curbs), may not be as reliably classified as other features that are relatively more prevalent in images, so the under-represented features (as a non-limiting example, DSFs) may be provided to a representation learning model that learns the representation of data without having a pre-prepared list of features to work from.

Continuing to refer to FIG. 6, described herein is a technique that evaluates the reliability of classification predictions, and based on such evaluations, saves under-represented data that a machine learning model needs to be trained on to improve its prediction capabilities. The technique may be useful for interpreting the trustworthiness of machine learning models in many applications. Employing the technique to enhance trustworthiness may be especially critical in a data-driven, active learning setting wherein a goal may be to achieve a certain threshold accuracy level with minimum labeling effort. In such settings a machine learning model may learn to select the most informative unlabeled samples for annotation based on the technique of the present teachings. Highly uncertain predictions may be assumed to be more informative for improving performance of a machine learning model. The system of the present teachings may therefore be designed to obtain data that a machine learning model does not understand (i.e., does not correctly interpret or classify) and train the machine learning model only on the obtained data. Such a system may attempt to find a level of uncertainty in the segmentation model predictions and determine the features in the input that affected the predictions.

Continuing to refer to FIG. 6, as those of skill would understand, deep learning models are a type of machine learning model that is based on artificial neural networks. When deploying a deep learning model, it may be useful to determine whether high-level features are being learned by the model, whether the model is correct for the right reasons, and whether the model is able to capture "expected features." In classical machine learning models, as opposed to deep learning models, a feature may be understood to be the specification of an attribute and of a value of that attribute. For example, "color" is an attribute; "color is blue" is a feature. As would be readily appreciated by one skilled in the art, there are various transformations to a set of attributes that leave the set of features unchanged. Non-limiting examples include regrouping attribute values and transforming multi-valued attributes to binary attributes. Classical machine learning models generally rely on feature engineering during the pre-processing phase of the modeling. In a computer vision task, for example detecting buildings in an image, features considered in classical machine learning may include but not be limited to at least some of the following: Pixel Color (e.g., RGB); Histogram of Oriented Gradients (HOG); Scale-Invariant Feature Transform (SIFT); Bag-of-Visual-words (BOV); Textons (e.g., corner detector, edge detector); and/or Pixel values transformed via some dimensionality reduction method. Those of skill would know how to derive the given feature and its semantic representation. Deep learning generally involves taking a different approach called representation learning. One of skill would appreciate that representation learning involves reasoning based on the data, defining architectures of models that learn the representation of the data. In contrast to predefining features that describe the data, "raw," or minimally pre-processed data is provided to the deep learning model. An expectation is that the deep learning model will learn a representation of the data that may not be known a priori and may not be explicitly associated with semantic concepts.

Continuing to refer to FIG. 6, in at least one arrangement, the system may perform the technique of the present teachings using a short-range U-Net segmentation model operating on raw, unlabeled images. The system may also save depth visualization images generated from raw, 1 channel depth images. In some arrangements the system may be scripted using the Python computer program. Those skilled in the art would appreciate that other suitable computer programs may be used. A configuration file may be used to compile the input settings needed for the instructions implementing the system to be run. The configuration file may contain paths to unlabeled RGB and depth images, a machine learning model checkpoint (for example, a file of weights to be applied to various data), directory paths where results may be stored, and hyperparameters for tuning the system. In an arrangement wherein the Python computer program is used, a Python file may be created to perform the system's instructions on raw images, separate the raw images into priority images and normal images, and compute depth visualizations on the priority images and the normal images. The depth visualizations may be computed in a parallel manner using more than one, or even all, cores of the central processing unit (CPU). Other files may include machine learning model architecture scripts, helper functions, etc.

Continuing to refer to FIG. 6, in at least one arrangement, the system may execute in real time, predicting the uncertainty of the classification of each frame in a camera image, as follows. A raw RGB image is fed to a trained U-Net model as input, and the model generates un-normalized prediction probabilities (called "logits") of the classification prediction. Such un-normalized values may be unrestricted in magnitude, whether positive or negative. Activation functions, such as those well-known in the art, for example, but not limited to, binary, linear, sigmoid, tanh, reLU, softplus, softsign, softmax, and swish, define the output given an input of a neuron/node to a next layer of a neural network. Because the un-normalized values can include negative numbers, an activation function can be applied to the values to convert all values to non-negative numbers. Another activation function can normalize the prediction probabilities such that each prediction probability takes on a value between 0 and 1. Other activation functions can be applied to the data depending upon the desired format of the matrix values. The U-Net classification output may be in the form of Channel×Height×Width, wherein Channel can have one of, for example, but not limited to, five values (or classification labels): Background, Non-Drivable (e.g., an obstacle), Standard Drivable, Enhanced Drivable (e.g., grass), and DSF (e.g., curbs). Each of the semantic labels is assigned a value, and a 5 channel matrix, or NumPy array, is generated. As those of skill would understand, NumPy is a library of array processing routines used by Python computer programs. The probabilities assigned to each classification label may be based at least in part on analysis of a dataset provided to the machine learning model. In some arrangements, a fraction of the softmax NumPy array may be cropped, so that the focus is only on the uncropped fraction of a given image. Cropping can be performed for a variety of reasons. For example, in an arrangement, the fraction cropped can be $3/5$ of the softmax NumPy array that represents the area that is farthest from the bot, with the focus being on the remaining (closest to the bot) $2/5$ of the array. Such cropping may be useful to remove any outlier predictions that would happen based on data from beyond a pre-selected distance from the short-range cameras. The fraction cropped need not be limited to any value, being dependent on the desired prediction accuracy at a given distance from the camera. The fraction cropped may be a tunable value, or hyperparameter. Model prediction values that are deemed uncertain may comprise a linspace (an evenly spaced sequence in an interval), defined by Start=0.4 and End=0.7, with Interval=0.05, for predictions per channel. As those of skill would understand, a linspace is a function in the NumPy library. Normalized prediction probability values for each pixel may be between 0 and 1, and may take on values in intervals of 0.05 (i.e., 0, 0.05. 0.1, 0.15, . . . , 0.95, 1). Pixels with normalized prediction probabilities of, for example, but not limited to, between a lower bound and an upper bound, possibly inclusive of the endpoints, are deemed sufficiently uncertain. For example, the lower bound can equal 0.4 and the upper bound can equal 0.7. The selected range of prediction probabilities need not be limited to a window of 0.4 to 0.7, nor be inclusive of either or both endpoints. The selected range of prediction probabilities may depend at least in part on the bias of the machine learning model in which the model produces results that are systematically prejudiced. The range of prediction probabilities may be a tunable range, or hyperparameter. Probabilities above the prediction probabilities range may not be sufficiently uncertain, and probabilities below the prediction probabilities range may leave a greater probability range than desired for other (e.g., more represented) classification labels. The model iterates through each pixel in the selected part of the image, taking maximum probability ("argmax") of the pixel. If the maximum probability (i.e., the argmax prediction) falls in the range of prediction probabilities, the channel index (representing the prediction class label) and the prediction probability value are saved. The process is repeated for each pixel in the image. For all pixels having prediction probability values that fall in the prediction probability range, a pixel count is performed for all classification labels. The pixel count for each classification label is the number of pixels in the selected image that belong to the classification label. For each of the five classification labels, an uncertainty ratio is calculated by dividing the pixel count for that classification label by the total number of pixels having the classification label. The images having associated uncertainty ratio and classification label count may then be filtered (i.e., sifted through) and saved according to predefined hyperparameter. By way of non-limiting example, images that have an uncertainty ratio>0.4 for the DSF classification label and a total number of pixels classified as DSF>1500 may be saved. Filtering according to metrics enables selecting the data that can be used to train the machine learning model on the priority failure cases. Height and Width may refer to a size of an image in the U-Net algorithm.

Continuing to refer to FIG. 6, saved data that fall within a predefined range of uncertainty ratios, or above a threshold uncertainty ratio value, may thereafter be used to train a machine learning model. Additionally or in the alternative, such saved data may be used by a machine learning model to make inferences about images the machine learning model receives.

Continuing to refer to FIG. 6, in at least one arrangement, the system of the present teachings may be executed in accordance with the actions shown in FIG. 6. Although the following description and FIG. 6 refer specifically to an image, any data can be processed by the system of the present teachings. The system is not limited to processing image data. With reference to FIG. 6, a processor having a receiver receives a raw RGB image and passes the image to a machine learning segmentation model executing in the processor in action 100. Control flow proceeds to action 102. In action 102, a portion of the image is selected for further processing. In some arrangements, the portion selected for further processing can include the portion of the image that is closest to the receiver. In some arrangements, the selected portion can coincide with a ratio of the image such as, for example, but not limited to, ⅔ of the image. Control flow proceeds to action 104, in which the model generates a set of prediction probability values for each pixel in the selected portion, in some arrangements applying a softmax function to generate an array of normalized prediction probability values (i.e., a set of prediction probability values each having a value between 0 and 1), the array in some arrangements being a 3D matrix with dimensions Channel, Height, and Width, wherein the Channel may take one of five classification labels: Background, Non-Drivable, Standard Drivable, Enhanced Drivable, and DSF, such that each of the five classification labels is assigned a prediction probability for each pixel in the array, which in some arrangements may be a NumPy array. Control flow proceeds to action 106, in which the model iterates through each pixel in the selected portion of the image, taking the maximum probability (for example with an argmax function) of each pixel. Control flow proceeds to action 108, in which it is determined for each pixel whether the maximum probability falls in a pre-selected range of uncertainty (e.g., 0.4 to 0.7), and the count of the number of pixels falling in that range for each classification. Control flow then proceeds to action 110. In action 110, for each classification, an uncertainty ratio is computed by dividing the count for each classification label in the pre-selected range by the total number of pixels for that classification in the cropped image. Control flow proceeds to action 112, in which images meeting pre-selected criteria based at least on the uncertainty ratio are used to train the machine learning model. The criteria can include, for example, a classification having a pre-selected threshold (for example, 0.4) for uncertainty ratio and, for example, a total number of pixels greater than another pre-selected threshold (for example, 1500). The criteria thresholds can be tunable.

In at least one arrangement, depth visualization may include conversion from 2D to 3D in order to facilitate annotation, e.g., in the event different terrains in an image are the same color (for example, road and sidewalk may both be red). In an arrangement, a depth image may be a 1 channel image containing the depth information per RGB pixel. In an arrangement a machine learning model may take as input the depth image and the camera position (e.g., left, center, right) and convert the depth pixels from the depth image from millimeters to meters for pixel depth values less than 7,000 mm, and may then de-project the depth pixel values from 2D to 3D x,y,z co-ordinates (z representing depth) for each pixel in a camera frame using parameters intrinsic to the particular camera. In an arrangement the de-projected pixels in the camera coordinate frame may be passed through a transform function to transform the de-projected pixels to a baselink coordinate frame for an autonomous vehicle or a bot. By way of non-limiting example, a baselink coordinate frame may be a frame of reference projecting from between rear tires of an autonomous vehicle or bot. The transform function may receive rotation and camera transforms, and use the received values to generate depth values, z, in the baselink frame.

Those of skill in the art would understand that information and signals may be represented using any of a variety of different existing techniques. For example, data, instructions, commands, information, signals, bits, symbols, or chips that may be referenced throughout the description may be represented by voltages, currents, electromagnetic waves, magnetic fields or particles, optical fields or particles, ultrasonic waves, projected capacitance, or any combination thereof.

Those of skill would further appreciate that the various illustrative logical blocks, modules, circuits, and method steps described in connection with the arrangements disclosed herein may be implemented as electronic hardware, computer software, or combinations of both. To clearly illustrate this interchangeability of hardware and software, various illustrative components, blocks, modules, circuits, and steps have been described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the appended claims.

The various illustrative logical blocks, modules, and circuits described in connection with the arrangements disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The actions of a method described in connection with the arrangements disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in functional equipment such as, e.g., a computer, a robot, a user terminal, a mobile telephone or tablet, a car, or an IP camera. In the alternative, the processor and the storage medium may reside as discrete components in such functional equipment.

The above description is not intended to be exhaustive or to limit the features to the precise forms disclosed. Various alternatives and modifications can be devised by those skilled in the art without departing from the disclosure, and the generic principles defined herein may be applied to other aspects without departing from the spirit or scope of the appended claims. Accordingly, the present disclosure is intended to embrace all such alternatives, modifications and variances. Additionally, while several arrangements of the present disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as examples of particular configurations. And those skilled in the art will envision other modifications within the scope and spirit of the claims appended hereto. Other elements, steps, actions, methods, and techniques that are not substantially different from those described above and/or in the appended claims are also intended to be within the scope of the disclosure. Thus, the appended claims are not intended to be limited to the arrangements shown and described herein, but are to be accorded the broadest scope consistent with the principles and novel features disclosed herein.

The arrangements shown in drawings are presented only to demonstrate certain examples of the disclosure. And, the drawings described are merely illustrative and are non-limiting. In the drawings, for illustrative purposes, the size of some of the elements may be exaggerated and not drawn to a particular scale. Additionally, elements shown within the drawings that have the same numbers may be identical elements or may be similar elements, depending on the context.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. Furthermore, to the extent that the terms "includes," "has," "possesses," and the like are used in the present description and claims, such terms are intended to be inclusive in a manner similar to the term "comprising," as "comprising" is interpreted when employed as a transitional word in a claim.

Furthermore, the terms "first", "second", "third" and the like, whether used in the description or in the claims, are provided to distinguish between similar elements and not necessarily to describe a sequential or chronological order. It is to be understood that the terms so used are interchangeable under appropriate circumstances (unless clearly disclosed otherwise) and that the aspects of the disclosure described herein are capable of operation in other sequences and/or arrangements than are described or illustrated herein.

A method of improving recognition of preselected categories of features while autonomously driving, comprising: determining which of the preselected categories a machine learning model fails to accurately predict; collecting specific sensor data associated with the preselected categories; and training the machine learning model to recognize the preselected categories based at least on training data derived from the collected specific sensor data.

The method of the preceding clause, wherein the determining comprises computing uncertainty data associated with the collected specific sensor data and identifying the preselected categories based on at least a part of the computed uncertainty data.

The method of the preceding clause, further comprising feeding at least some of the collected sensor data into the machine learning model; receiving unnormalized predictions of the preselected categories from the machine learning model; normalizing the unnormalized predictions; generating an array of elements that represents the normalized predictions, cropping the array; determining a maximum probability for each of the preselected categories for each element of the array; storing identifiers associated with each element having a maximum probability within a preselected range of probabilities; defining, for each of the preselected categories, normalized elements having values within a maximum probability within the preselected range of probabilities as uncertainty data for the preselected category;

computing a ratio of the uncertainty data for each of the preselected categories, the ratio being a count of the uncertainty data in the preselected category divided by a total of the elements in the category; and selecting the training data based at least in part on the uncertainty ratios and the total of the elements for the preselected classes.

The method of any preceding clause, wherein the training comprises real-time training of the machine learning model during the autonomous driving.

A method of classifying pixel data, comprising: establishing a plurality of classes corresponding to relative degrees of terrain drivability; acquiring an image of pixel data with a sensor; assigning, by a processor, a pixel prediction uncertainty label to pixels that fall within a predefined range of uncertainty; and computing, by the processor, an uncertainty ratio value for each of the plurality of classes, the uncertainty ratio value being equal to number of pixels in the class having an uncertainty label divided by total number of pixels in the class.

The method of the preceding clause, further comprising discarding a fraction of the image data that is relatively farther away from the sensor.

The method of claim the preceding clause, wherein the fraction is three-fifths.

The method of any preceding clause, further comprising determining a maximum probability value for a depth of each pixel, the assigning an uncertainty value to each pixel being based on the maximum probability value.

The method of claim any preceding clause, further comprising providing for machine learning training a set of pixels having uncertainty ratio values for a given class that fall within predefined ranges. The method of any preceding clause, further comprising providing for machine learning inference a set of pixels having uncertainty ratio values for a given class that fall within predefined ranges.

An autonomous vehicle, comprising: a body; a plurality of wheels coupled to and configured to support the body; at least one sensor coupled to the body; and a processor housed in the body and coupled to the at least one sensor, the processor configured to execute a machine learning model having been trained to recognize preselected categories based at least in part on a subset of data received from the at least one sensor, the subset of data having an associated range of prediction uncertainty.

The autonomous vehicle of the preceding clause, wherein the processor is coupled to a memory that stores the machine learning model, the machine learning model including instructions executable by the processor to generate unnormalized predictions of the preselected categories, normalize the unnormalized predictions, generate an array of elements that represents the normalized predictions, crop the array, determine a maximum probability for each of the preselected categories for each array element of the array, store identifiers associated with each of the array elements having the maximum probability within a preselected range of probabilities, define, for each of the preselected categories, normalized elements having values within the maximum probability within the preselected range of probabilities as uncertainty data for one of the preselected categories, compute an uncertainty ratio of the uncertainty data for each of the preselected categories, the uncertainty ratio being a count of the uncertainty data in the preselected category divided by a total of the array elements in the category, and select the training data based at least in part on the uncertainty ratio and the total of the array elements for the preselected categories.

An autonomous vehicle, comprising: a body; a plurality of wheels coupled to and configured to support the body; at least one sensor coupled to the body; and a processor housed in the body and coupled to the at least one sensor, the processor configured to receive image data from the at least one sensor, the image data including a first plurality of pixels, the processor further configured to execute a machine learning model to recognize and assign pixels of the first plurality of pixels to preselected terrain drivability classes, the machine learning model having been trained with a second plurality of pixels of an under-represented terrain drivability class having an uncertainty ratio value that falls within a predefined uncertainty range, the uncertainty ratio value comprising a quotient of a number of pixels having prediction probabilities that fall within the predefined uncertainty range and a total count of the second plurality of pixels.

The autonomous vehicle of the preceding clause, wherein the processor is coupled to a memory that stores the machine learning model, the machine learning model including instructions executable by the processor to discarding a fraction of the image data that is relatively farther away from the at least one sensor.

The autonomous vehicle of the preceding clause, wherein the fraction is three-fifths.

The autonomous vehicle of any preceding clause, wherein the processor is further configured to determine a maximum probability value for a depth of each pixel of the pixel data.

What is claimed is:

1. A method of improving recognition of preselected categories of features while autonomously driving, comprising:
    determining which of the preselected categories a machine learning model fails to accurately predict;
    collecting sensor data associated with the preselected categories;
    training the machine learning model to recognize the preselected categories based at least on training data derived from the collected sensor data;
    feeding at least some of the collected sensor data into the machine learning model;
    receiving unnormalized predictions of the preselected categories from the machine learning model;
    normalizing the unnormalized predictions;
    generating an array of elements that represents the normalized predictions, cropping the array;
    determining a maximum probability for each of the preselected categories for each array element of the array;
    storing identifiers associated with each of the array elements having the maximum probability within a preselected range of probabilities;
    defining, for each of the preselected categories, normalized elements having values within the maximum probability within the preselected range of probabilities as uncertainty data for one of the preselected categories;
    computing an uncertainty ratio of the uncertainty data for each of the preselected categories, the uncertainty ratio being a count of the uncertainty data in the preselected category divided by a total of the array elements in the category; and
    selecting the training data based at least in part on the uncertainty ratio and the total of the array elements for the preselected categories.

2. The method of claim 1, wherein the determining comprises computing uncertainty data associated with the collected sensor data and identifying the preselected categories based on at least a part of the computed uncertainty data.

3. The method of claim 1, wherein the training comprises real-time training of the machine learning model during the autonomous driving.

\* \* \* \* \*